United States Patent [19]

Just et al.

[11] Patent Number: 4,618,110
[45] Date of Patent: Oct. 21, 1986

[54] QUICK RELEASE LOCK FOR A PARACHUTE

[75] Inventors: Herbert Just, Hohnstorf; Holger Hansen, Hamburg, both of Fed. Rep. of Germany

[73] Assignee: Autoflug GmbH, Relligen, Fed. Rep. of Germany

[21] Appl. No.: 673,468

[22] Filed: Nov. 20, 1984

[30] Foreign Application Priority Data

Nov. 22, 1983 [DE] Fed. Rep. of Germany ....... 3342092

[51] Int. Cl.⁴ ............................................. B64D 17/38
[52] U.S. Cl. ................................................. 244/151 B
[58] Field of Search ............ 244/147, 149, 150, 151 B

[56] References Cited

U.S. PATENT DOCUMENTS 3,419,235 12/1968 Wood, Jr. ........................ 244/151 B
3,547,383 12/1970 Carpenter, Jr. ..................... 244/150
3,813,066 5/1974 Raznor ................................ 244/150
3,872,556 3/1975 Frost ............................... 244/151 B

FOREIGN PATENT DOCUMENTS 3309698 9/1984 Fed. Rep. of Germany ...... 244/150
2480705 10/1981 France ............................. 244/151 B Primary Examiner—Trygve M. Blix
Assistant Examiner—Rodney Corl
Attorney, Agent, or Firm—Townsend & Townsend

[57] ABSTRACT

In the quick-release lock for a parachute, a measuring device (1, 2) is used for continuously measuring the distance of the parachutist from the surface on which he intends to land. In this arrangement, the measured distance values are repeatedly compared with predetermined values in a comparing device (3, 4, 7) during the descent. Only if the measured values agree with the predetermined values during the last section of the descent during, which the comparisons are carried out, is the parachute automatically released from the load, for example a person, when the distance 0 is reached.

11 Claims, 1 Drawing Figure

U.S. Patent     Oct. 21, 1986     4,618,110
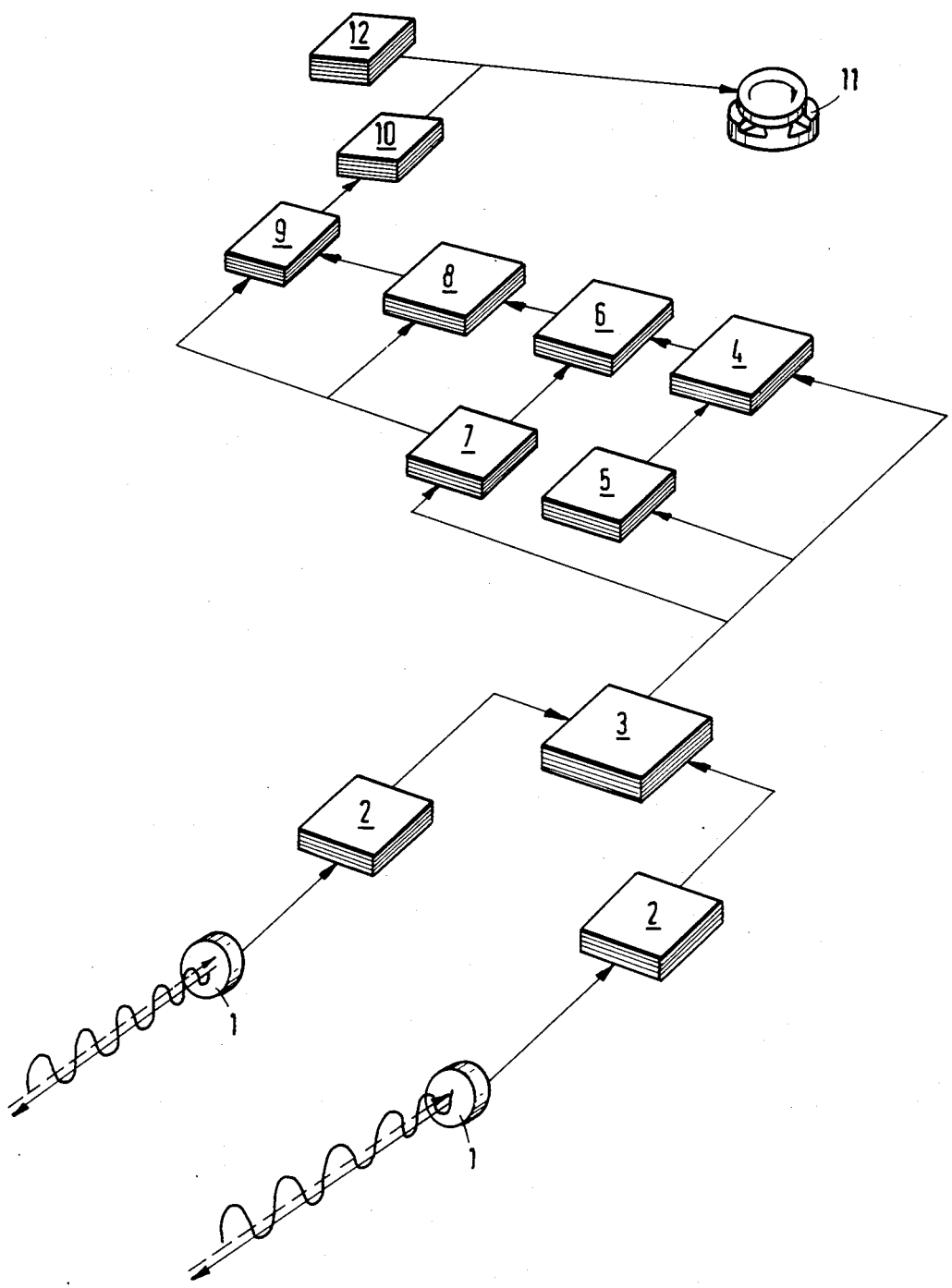

QUICK RELEASE LOCK FOR A PARACHUTE

The invention relates to a quick-release lock for a parachute for automatically releasing the parachute from the load carried by it, particularly a person, when the parachute descent is ended on reaching a surface.

When loads are dropped from aircraft with the aid of parachutes, but particularly when persons are jumping with parachutes, the reliable opening of the parachute in order to prevent fatal accidents or losses of material is not the only problem. In addition, the parachute must be rapidly released after the parachute descent has ended since otherwise the load and particularly the person can be dragged across the terrain in strong winds and can thus be damaged or injured, respectively. A person's life is in danger also during a landing in water because of the danger that the person secured in the webbing is drawn underwater by the parachute canopy which has not yet collapsed.

For this reason, parachutes for persons are provided with a quick-release lock which can be used by the parachutist to release himself quickly from the parachute when he has reached the surface. However, the above-mentioned dangers are present if the parachutist is injured, unconscious, under shock or prevented for other reasons from opening this manually operated quick-release lock.

In a quick-release lock of the type initially mentioned, these dangers present on landing in water are prevented by the fact that the quick-release lock is opened when the water surface is reached and water thus penetrates into the lock. However, this automatic quick-release lock has the disadvantage that it can be effective only with a landing in water but not when landing on solid ground. In addition, the danger always exists that the quick-release lock is opened by humidity, rain, water spray and similar before the parachutist has reached the ground which can lead to fatal accidents.

The invention has the object of creating an automatic quick-release lock in which, on the one hand, premature opening is reliably prevented but which, on the other hand, opens even when landing on dry ground.

According to the invention, this is achieved by the fact that it is provided with a measuring device for the continuous measuring of the distance from the surface, with a comparing device for the repeated comparing of the measured distance with predetermined values during the descent and with a triggering device by means of which separation can be effected in dependence on the signals of the measuring and comparing device.

The quick-release lock thus contains a device by means of which the distance from the surface on which landing is intended is measured. Such measuring devices have been disclosed in another connection, in which devices the parachute is intended to open only at a predetermined height above the ground (German Utility Pat. No. 1,948,253, German Offenlegungsschrift No. 1,578,510) so that the object dropped cannot be carried too far off course by the wind. If in this arrangement triggering takes place too early (which, in the case of the subject-matter of the application would mean the death of the parachutist if he does not have a spare parachute), in these previously known systems the parachute is merely opened too early. If, on the other hand, triggering takes place too late (which, in the case of the subject-matter of the application, would mean that the parachutist is possibly dragged through the terrain or pressed under water), merely a loss of material occurs in the case of the prior systems.

However, in order to guarantee reliable operation (which is absolutely necessary for the subject-matter of the application), not only the distance is measured and the lock opened at distance 0, but, additionally, a comparing device is provided for repeatedly comparing the measured distance with predetermined values during the descent, in which arrangement the triggering device effects separation in dependence on the signals of the measuring and comparing device.

Thus the measured actual distance is continuously compared during the descent with nominal values for the distance. If the two do not agree, the measurements are obviously faulty. In this case, the quick-release lock is blocked so that it cannot open by mistake. This method achieves with a high degree of safety that the quick-release lock cannot open prematurely.

In this arrangement, the triggering device can be electrically actuated since at least the comparing device already requires electric or electronic circuits. In this arrangement, the triggering device can be provided with an electrically fired explosive capsule. However, a triggering device provided with an electrically fired propellant gas device has been found to be particularly advantageous.

Since particular importance is placed on the fact that the quick-release lock opens only in quite unambiguous situations, the danger naturally also exists that, in individual cases, it will not open after the parachutist has reached the ground. To enable him quickly to release the parachute in this case, the quick-release lock of the invention can be advantageously additionally provided with a manually actuated triggering device.

The electric/electronic circuits of the quick-release lock are well shielded in order to prevent the lock from being accidentally opened by external influences. So that the lock, however, cannot open before needed, for example with rough treatment, an advantageous additional provision can be that the lock is provided with devices for activating the triggering device during the preparation and/or initiation of the descent. The lock can be activated, for example when the parachutist jumps out of the aircraft. On the other hand, it can be activated when a pilot operates the ejection seat.

A second activation can advantageously occur by the comparing device being activated when a predetermined distance is reached. Thus the distance from the ground is continuously measured after activation. As long as this distance has a higher value than a predetermined value (for example 50 m), the comparing device is not yet active. Only after the value has dropped below this distance does the comparing device compare the measured distance with the nominal values. If the distance increases again (for example due to a gust of wind) to more than the predetermined distance (here 50 meters) activation again takes place with renewed falling to the predetermined distance; the comparing device resumes its work.

The lock according to the invention can be provided with a digital counting chain which begins with the counting process when the predetermined distance is reached. Thus, for example, distances of 50 m, 49 m, 48 m, 47 m, . . . , and so forth are measured. If one of these measured values is missing, the quick release lock is automatically blocked or deactivated in order to prevent premature opening. If the difference in distance has further decreased and a further predetermined value (for example 30 m) has been reached, a more or less even speed of descent can be expected. From this moment on, an advantageous provision can be that the comparing devices do not only continue to count the distances but also a circuit is provided for determining the time intervals of measured differences in distance. From this height, therefore, it can be simultaneously checked whether the measurement results are compatible with the result of a more or less uniform rate of descent. The signals of a uniform rate of descent can be generated by a clock generator. This clock generator can then be used, when a third distance (for example 5 m) is reached, for generating distance signals during the last section of the descent. At a rate of descent of approximately 6 m per second, to be expected for rescue parachute systems, these last 5 m are travelled in less than one second so that the comparing circuit could be too slow to report in time that the ground has been reached.

Thus, in all cases the measured distance (actual value) is compared with a nominal value; if the actual value deviates from predetermined values or functions such as generated, for example, by rain, snow or other particles suspended in the air, the quick-release lock is immediately deactivated in order to prevent it from opening prematurely.

In order to increase the measuring accuracy and the safety against possible interference, an advantageous provision can be that the measuring device is provided with two sensors, which are arranged at an angle to each other, for measuring the distance.

The distance between parachutist and ground could be measured, for example with the aid of radar, but it is much simpler to measure the distance with the aid of ultrasonic distance meters.

In the text which follows, the invention is described with the aid of an embodiment by referring to the attached drawing which shows a block diagram.

Two ultrasonic sensors 1, arranged at an angle to each other, are provided with measurement transducers 2 which, in turn, are connected to a computer 3. The computer 3 is connected to a counter 4, a switch 5 for the first predetermined distance (for example 50 m) and a clock generator 7. In this arrangement, the switch 5 is also connected to the counter 4. The counter 4 is connected to a second switch 6 for the second predetermined distance (here, for example, 30 m) which, in turn, is alsp connected to the clock generator 7. The switch 6 is connected to the third switch 8 (for the further predetermined distance of, for example, 5 m) which is also connected to the clock generator 7. The switch 8 is connected to the firing device 9 which is also connected to the clock generator 7. The firing device 9 is connected to the propellent gas device 10 which acts on the mechanical quick-release lock 11. In this arrangement, the connection can be separated not only by the elements mentioned but also by a manually actuated device 12 which is also connected to the mechanical quick-release lock 11.

The fact that two different ultrasonic sensors 1 are provided also has the advantage that the sensors are less easily disturbed by external influences, for example external radio services since both measurement value pick-ups cannot be simultaneously affected in the correct clock sequence. If, nevertheless, a disturbance, that is to say a deviation from the predetermined nominal values, is detected, the same happens as when the first predetermined distance (from here, for example, 50 m) is exceeded: the entire system is switched off and resumes the comparing between actual value and nominal value at a later time.

We claim:

1. Quick-release lock for a parachute for automatically releasing the parachute from the load carried by it, particularly a person, when the descent of the parachute is ended when reaching a surface, this lock comprising:
    a measuring device for continuously measuring the distance from the surface;
    comparing means connected to the measuring device for repeatedly comparing, during at least a part of the descent, the measured distances with an ordered set of predetermined values indicative of the actual distances from the surface which should be measured during this part of a normal descent; and
    triggering means connected to the comparing means for releasing the parachute from the load when the descent is ended only if the comparing means indicate that the measured distances agree with the predetermined values.

2. Quick-release lock as claimed in claim 1, wherein the triggering device (9, 10) is provided with an electrically fired explosive capsule.

3. Quick-release lock as claimed in claim 1, wherein the triggering device (9, 10) is provided with an electrically fired propellant gas device (10).

4. Quick-release lock as claimed in claim 1, wherein additionally a manually actuated triggering device (12) is provided.

5. Quick-release lock as claimed in claim 1, wherein devices for activating the triggering device (9, 10) during the preparation and/or initiation of the descent are provided.

6. Quick-release lock as claimed in claim 1, wherein a switch (5) is provided for activating the comparing device (3, 4, 7) when a predetermined distance is reached.

7. Quick-release lock as claimed in claim 6, wherein a digital counting chain (4) is provided which begins the counting process when the predetermined distance is reached.

8. Quick-release lock as claimed in claim 1, wherein the comparing devices (3, 4, 7) are provided with a circuit (6, 7) for determining the time interval of measured differences in distance.

9. Quick-release lock as claimed in claim 1, wherein a clock generator (7) is provided for generating distance signals during the last section of the descent.

10. Quick-release lock as claimed in claim 1, wherein the measuring device (1, 2) is an ultrasonic distance meter.

11. Quick-release lock for a parachute for automatically releasing the parachute from the load carried by it, particularly a person, when the descent of the parachute is ended when reaching a surface, this lock comprising a measuring device for the continuous measuring of the distance from the surface, with a comparing device for the repeated comparing, during the descent, of the measured distance with predetermined values and with a triggering device by means of which the releasing can be effected in dependence on the signals of the measuring and comparing device wherein the measuring device is provided with two sensors, which are arranged at an angle to each other, for measuring the distance.

* * * * *